(12) United States Patent
Kuo et al.

(10) Patent No.: US 6,839,668 B2
(45) Date of Patent: Jan. 4, 2005

(54) STORE SPEECH, SELECT VOCABULARY TO RECOGNIZE WORD

(75) Inventors: Jie Yung Kuo, Eindhoven (NL); Martijn Alexander Bakker, Tilburg (NL); Leonardus Jacobus Hendrikus Theodorus Maria Clabbers, Amsterdam (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 602 days.

(21) Appl. No.: 10/022,392

(22) Filed: Dec. 13, 2001

(65) Prior Publication Data

US 2002/0103641 A1 Aug. 1, 2002

(30) Foreign Application Priority Data

Dec. 18, 2000 (EP) .......................................... 00204640

(51) Int. Cl.[7] .......................... G10L 15/06; G10L 15/18
(52) U.S. Cl. ........................ 704/244; 704/255; 704/257
(58) Field of Search ................. 704/211–215, 243–245, 704/221, 255–257

(56) References Cited

U.S. PATENT DOCUMENTS

| | | | | | |
|---|---|---|---|---|---|
| 5,157,727 | A | * | 10/1992 | Schloss | ....................... 704/213 |
| 5,794,189 | A | * | 8/1998 | Gould | ......................... 704/231 |
| 5,909,662 | A | * | 6/1999 | Yamazaki et al. | ........... 704/221 |
| 6,240,389 | B1 | * | 5/2001 | Keiller et al. | ................ 704/243 |
| 6,263,308 | B1 | * | 7/2001 | Heckerman et al. | ......... 704/231 |

* cited by examiner

Primary Examiner—David D. Knepper

(57) ABSTRACT

For operating a speech recognition facility, the following steps are executed: a stream of concatenated speech items is received and stored; various such received speech items are recognized; and a representation of recognized speech items is associated for operative outputting. In particular, the following further steps are executed:

a. from the stored speech items, a first non-recognized speech item for recognizing viz à viz an actual limited vocabulary is selected to get a recognition representation or a failure;

b. through the failure a second non-recognized speech item is selected for recognition whilst maintaining the actual limited vocabulary and returning to a);

c. and through the recognition a third non-recognized speech item is selected, amending the actual limited vocabulary and returning to a);

d. until attaining a sufficient amount of recognitions for operative outputting.

8 Claims, 3 Drawing Sheets

| Addressing | Action | Action parameter |
|---|---|---|
| 1. TV<br>2. CD<br>3. Tuner | 1.1 Teletext<br>1.2 Channel<br>1.3 Settings<br>1.4 ... | 1.1.a sport<br>1.1.b etc ... |
| | | 1.2.a CNN<br>1.2.b etc ... |
| | | 1.3.a image.<br>1.3.b etc ... |
| | | 1.4.a ... |
| | 2.1 PLAY<br>2.2 Change<br>2.3 Volume<br>2.4 ... | 2.1.a next<br>2.1.b TRACK 1<br>2.1.c etc ... |
| | | 2.2.a CD1<br>2.2.b CD2<br>2.2.c etc ... |
| | | 2.3.a loud<br>2.3.b ... |
| | | 2.4.a ... |
| | 3.1 Volume<br>3.2 Channel<br>3.3 Search<br>3.4 ... | 3.1.a loud<br>3.1.b etc ... |
| | | 3.2.a Sky radio<br>3.2.b etc ... |
| | | 3.3.a Rock<br>3.3.b jazz<br>3.3.c etc ... |
| | | 3.4.a ... |

FIG. 4

STORE SPEECH, SELECT VOCABULARY TO RECOGNIZE WORD

A method for speech recognition through storing a stream of concatenated speech items, and therefrom in successive cycles selecting a non-recognized speech item for recognizing viz à viz an associated limited and selectable vocabulary, and an apparatus for implementing the method.

BACKGROUND OF THE INVENTION

The invention relates to a method for operating a speech recognition arrangement. In particular, the invention relates to a method as recited in the preamble of Claim 1. At present, various appliances are becoming voice-controlled. The operative outputting may imply executing a command, asking for further speech input, or having another result that is appropriate for the appliance in question.

Now, many present-day dedicated speech recognition circuits use only a small active vocabulary, which smallness feature brings about the advantage of fast and accurate recognition. An associated disadvantage is however that only commands and similar items within a limited set thereof can ever be recognized. Reloading of a different vocabulary into the arrangement is a relatively slow and tedious process that, even if successful, would slow down an interactive recognition process appreciably, in particular, because the presentation of a next speech item would have to wait until recognition of all preceding speech items were accomplished.

The present inventors have recognized that recording of the sound as received is often not the bottleneck, and that a hierarchical recognition procedure would allow to combine a relatively large overall vocabulary with the possibility for allowing uninterrupted continuous speech inputting. Moreover, they have found that users may well be saying there right words, but are prone to present an incorrect sequence of speech items. In fact, irrelevant items may be inserted, the sequence of the words may be inverted with respect to the correct one, and so on. In consequence, the inventors have come up with the idea that the recognizing of certain speech items might be delayed or abandoned, in favor of the recognizing of other speech items as received, to so improve flexibility by means of simple and inexpensive measures.

The inventors have also recognized that the calling up of a next speech item may be an order of magnitude faster than the calling up of a next partial vocabulary, in as much as such vocabulary may contain a much larger number of items-for-recognition.

SUMMARY TO THE INVENTION

In consequence, amongst other things, it is an object of the invention to allow uninterrupted speech inputting whilst effectively using a larger vocabulary, of which instantaneously only a smaller part is active through a hierarchical selection in said larger vocabulary, and furthermore to allow for delaying or abandoning the recognizing of certain problem items. In fact, according to the present invention, a successfully recognized word or other item would tend to point both to another speech item as well as to an associated vocabulary, whereas an unsuccessfully recognized word would tend to point to another word whilst in contradistinction maintaining the vocabulary.

Now therefore, according to one of its aspects the invention is characterized according to the characterizing part of Claim 1.

The invention also relates to a apparatus arranged for implementing a method as claimed in Claim 1. Further advantageous aspects of the invention are recited in dependent Claims.

BRIEF DESCRIPTION OF THE DRAWING

These and further aspects and advantages of the invention will be discussed more in detail hereinafter with reference to the disclosure of preferred embodiments, and in particular with reference to the appended Figures that show:

FIG. 4, a diagram of an exemplary command structure.

DETAILED DESCRIPTION OF PREFERRED EMBODIMENTS

Figure 1:
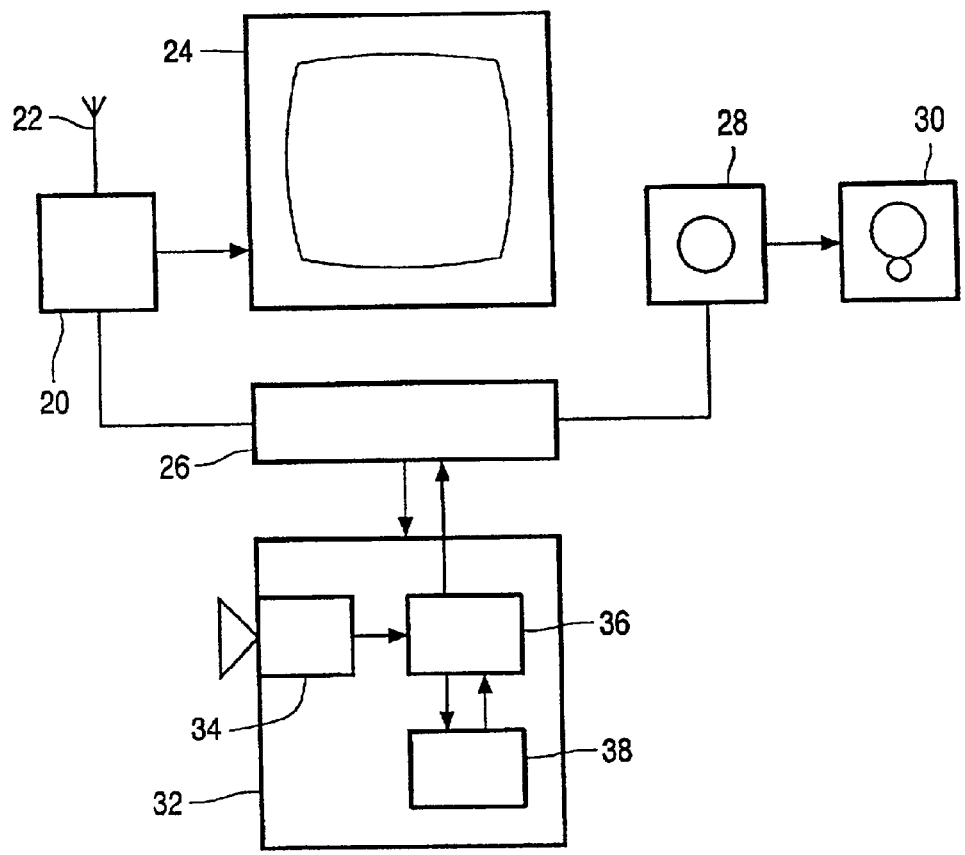
FIG. 1, a block diagram of a speech-enhanced device.

FIG. 1 illustrates a block diagram of a speech-enhanced device, such as for effecting a consumer audio/video functionality. However, other environments, such as games, appliances, motor vehicles, telephone sets, etcetera are equally viable. In the embodiment, the user functionality implies television set 24, tuner 20, antenna 22, CD player 28, and loudspeaker subsystem 30. These subsystems are controlled and interconnected by a central control facility 26. Control commands will emanate from facility 26, such as being originated by user button actuation or remote control, not shown, or rather, according to the present invention, emanating from a speech recognition facility housed in subsystem 32 that bidirectionally interfaces to control facility 26. Speech-to-be-recognized is received on microphone 34 as a stream that may continuous, and which stream can be recognized in recognizer subsystem 36 through selectively accessing and addressing speech memory 38. If applicable, the speech channel may be bidirectional viz à viz a user person, but this is not a restriction.

Figure 2:
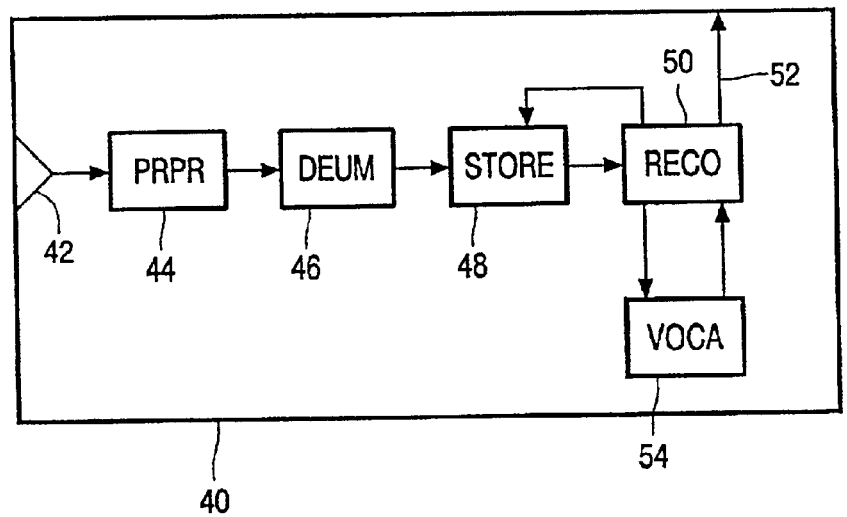
FIG. 2, a more detailed block diagram of the speech recognition facility.

FIG. 2 illustrates a more detailed block diagram of a speech recognition facility embodiment. The recognition facility 40 receives the speech through microphone 42, whereupon the speech is preprocessed to suppress background and other unwanted noise, and to execute filtering and similar preliminary operations. Block 46 executes delimiting of the speech to break it down into separate words or other items that can be recognized separately. Another procedure is to store unpreprocessed speech, to be processed before recognizing. In block 48 the string of words and/or other items is stored in separately accessible memory locations to allow selecting of a particular recognizable such item. In block 50 the items are successively called in and subjected to a recognition process, as based on an actual and generally partial vocabulary extracted from storage subsystem 54. The outcome of the recognition in block 50 can call up a next item for recognition, and also call up an associated partial vocabulary that is based on the identity of the recognized item from block 50. However, if the item is not recognized, the system may retain the actual vocabulary, but go to a new item. Most often, this will be one that succeeds the unrecognized item in time. If applicable as based on the status of the recognition process, a command for the remainder of the system will be sent out on line 52 that may be connected to block 26 in FIG. 1. On the other hand, certain results can make the apparatus signal a failure to the user. The apparatus may then ask for a whole or partial new speech input (for example if one word is missing or a parameter value is out-of-range), signal that the command cannot be executed (for example if an associated subsystem has been taken away), or other.

Figure 3:
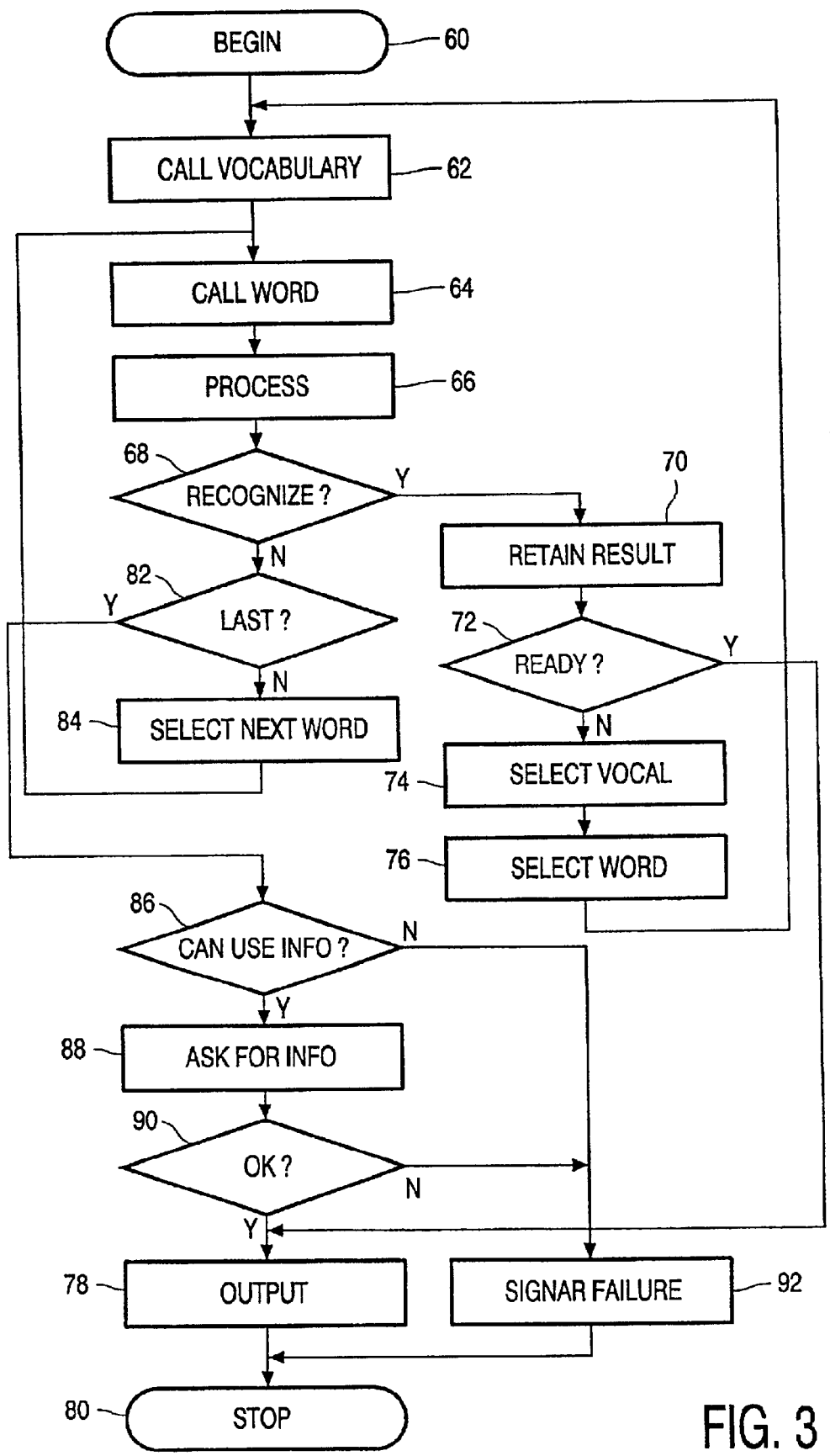
FIG. 3, a flow chart of the hierarchical speech recognition.

FIG. 3 illustrates a flow chart of the hierarchical speech recognition of the present invention. In block 60, the process is started though claiming and assigning the necessary hardware and software facilities. In block 62 a first partial vocabulary is called up. In block 64 the first word or similar recognizable item is called up from memory 48 in FIG. 2. In block 66 the speech item is subjected to the recognition processing. In block 68 the system detects whether a successful recognition has indeed been effected. If positive, in block 70, the result is retained. In block 72, the system detects whether the amount of items recognized is sufficient for operative outputting. If no, in block 74 the new partial vocabulary is selected. In block 76, the new speech item is selected. Then, the system goes to block 62 again. Eventually, the answer in block 72 may become positive. Then the system goes to block 78 for the operative outputting, and the operation stops in block 80.

If negative in block 68, the system goes to block 82 and looks whether the item was the last to be taken into consideration. This may be the last item in time, or rather the last item that could help in finding an ultimately good result. If not the last, the system in block 84 selects the next appropriate speech item and reverts to block 64. Often, this will be the next item in the progress of time, but under certain circumstances, this stepping will be counter to the progress of time. If the item causing the failed recognition was the last indeed, in block 86 the system detects whether additional information from the user could help, such as the pressing of a button or the presenting of a particular item (not necessary the most recently recognition sought for). If yes, the system in block 88 asks for such item and in block 90 checks whether the input was the one sought for, and the recognizing has attained its goal (just as in block 72). If positive, the system goes again to block 78. If negative in block 90 or in block 86, the additional information had been judged as insufficient anyway, the system goes to block 92, wherein failure is signaled, such as by asking for a complete new utterance from the user. Then the system goes to block 80.

The system could feature a much more sophisticated retry organization, such as in that the negative outputs from blocks 86, 90, could be considered more fully. For example, after block 86 a new partial vocabulary could be chosen, such under the assumption that one of the recognized speech items had in fact not been intended by the user person, who had then effectively proceeded with another series of speech items. Only if the recognizing were to stall a second time, the system would then signal the failure of block 92. Various other tactics under the strategy of the present invention have been ignored for the sake of brevity.

FIG. 4 illustrates a diagram of an exemplary command structure, in particular for use with a multi-device audio/video environment. The first block represents an initial vocabulary to address the appropriate device, such as the TV, the CD player, or the Tuner. The next column of blocks represents for each address an appropriate set of Actions, that for a TV set could allow selecting Teletext, a particular Channel, various Settings, and the like. Similarly, for a CD-player, the next column of blocks may specify Play, Change to a next CD, Adjust Volume, etcetera. Also, a Tuner entry has been shown in the first column, but it should be recognized that various other devices could be present, such as a CD-writer, a Screen Printer, various Household Appliances, etcetera. Also in the next column of blocks, not all feasible entries have been shown.

Upon specifying the Action in question, the third column of blocks will therefor specify an Action Parameter, such as selecting a Sports section of Teletext, for Channel a particular Channel, for Settings a particular aspect of the Settings that is wanted to be adjusted. Similar choices have been implemented for the CD player (second block in the second column) and for the Tuner. Of course, the hierarchy may even be deeper than the three successive levels shown in the embodiment.

Now, various methods for switching among the respective vocabularies are feasible. A first one is dependent upon the sequence of recognition: here the choice depends on the speed of "recognizing recorded items or sections" and the attainable speed of the "vocabulary switching". In the above context, the switching may be based on word spotting. Here, every section of a spoken sentence is tested versus the active sub-vocabulary. Once a word is recognized, the associated vocabulary on the next lower hierarchical level will be loaded. Another strategy will recognize words in a spoken sequence. Here, the first word spoken will be tested versus all vocabularies, and then the next word, whilst presenting the vocabularies in a logical sequence. Once a word will have been found, the system loads a vocabulary that is logically related to the result of the recognition. For example, when the system finds the phrase "sky radio", it knows that it has to use the radio-related procedure. For example, it can already start the tuner, whilst in parallel therewith proceeding with the recognition, and checking subsequent speech items to verify that the actual user person wants to more specifically deal with the music, such as recording it or otherwise.

The structuring of the vocabularies can be executed in various different ways. A first one is the rigid organization shown in FIG. 1. A second organization has been termed amorphous. This may be used when various vocabularies share a particular command or other speech item. This allows to create combinations of speech items that match with the various different commands that users may present at a particular stage in time of operating a particular device. For example, the speech as received may contain various speech items that are by themselves superfluous or even contraproductive. The recognition of a combination of a plurality of speech items allows to phase-out such irrelevant speech items. The speech recognition may allow for completely hands-free operating of a particular device. However, such may combine with various non-speech elements of a user interface organization, such as a mechanical action by the user in the form of mechanically inserting a tape or disk, the actuation of a control button, or a stylus entry. Also, self-reliant operation of the device to be controlled can influence the effect of the speech recognition, such as the attaining of a tape's end, which would render the changing of the volume control superfluous.

What is claimed is:

1. A method for operating a speech recognition facility, comprising the steps of:

receiving and storing a stream of concatenated speech items;

recognizing various such received speech items;

and associating a representation of recognized speech items for operative outputting;

said method being characterized by the following further steps:

a. from said stored speech items, selecting a first non-recognized speech item for recognizing viz à viz an actual limited vocabulary to get a recognition representation or a failure;

b. through said failure selecting a second non-recognized speech item for recognition whilst maintaining said actual limited vocabulary and returning to a);

c. and through said recognition selecting a third non-recognized speech item, amending said actual limited vocabulary and returning to a);

d. until attaining a sufficient amount of recognitions for said operative outputting.

2. A method as claimed in claim 1, wherein said selecting in step b) operates substantially along with the progress of time.

3. A method as claimed in claim 1, wherein said selecting in step b) allows to step in a direction counter to the progress of time.

4. A method as claimed in claim 1, wherein said selecting under b) is arranged to practice word spotting.

5. A method as claimed in claim 1, wherein said selecting under b) is selectively modified to recognizing words in a spoken sentence.

6. A method as claimed in claim 1, wherein in step c. the selecting of said third item bases at least in part on relative positions of earlier recognized items and their recognition results.

7. An apparatus being arranged for implementing a method as recited in claim 1, said apparatus comprising receiving means for receiving and storing a stream of concatenated speech items, feeding recognizing means for recognizing various such received speech items, and associating means for associating a representation of recognized speech items for operative outputting, said apparatus being characterized by comprising selection means for from said stored speech items selecting a first non-recognized speech item for recognizing viz à viz an actual limited vocabulary to get a recognition representation or a failure, retrocoupling means fed by said recognizing means for under control of said failure selecting a second non-recognized speech item for recognition whilst maintaining said actual limited vocabulary and returning to a), but through said recognition selecting a third non-recognized speech item, amending said actual limited vocabulary and returning to a), until attaining a sufficient amount of recognitions for said operative outputting.

8. An apparatus as claimed in claim 7 and encompassing an audio/video consumer facility.

* * * * *